UNITED STATES PATENT OFFICE 2,432,439

SYNTHESIS OF SACCHAROSONIC ACIDS AND SALTS THEREOF

Joseph D. Surmatis, Nutley, and Alfred Ofner, Montclair, N. J., assignors to Hoffmann-La Roche Inc., Nutley, N. J., a corporation of New Jersey No Drawing. Appl'cation May 23, 1946, Serial No. 671,902

9 Claims. (Cl. 260—344)

Our invention relates to the synthesis of saccharosonic acids, e. g., ascorbic acids. Acids of this class possess utility, for instance, as antiscorbutic agents and anti-oxidants. Our invention also relates to the preparation of ammonium salts of these acids.

In our copending application (I) Serial No. 671,901, filed of even date, titled Chemical compounds and method of manufacture, we have disclosed and claimed the preparation of amides of the general formula:

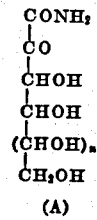

(A)

and ammonium salts thereof, in which $n$ represents zero or a low positive integer.

We have now found that these amides, and their ammonium salts, can be converted into ammonium salts of corresponding saccharosonic acids. The treatment of the amide (A) with anhydrous ammonia produces an ammonium salt thereof, which rearranges to form a lactone of the general formula:

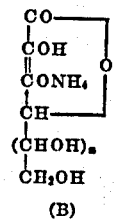

(B)

which in turn can be converted into the free saccharosonic acid.

The ammonium salt of the amide has the formula:

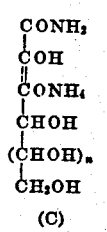

(C)

This salt is transformed into the ammonium salt of formula (B), by loss of ammonia.

The synthesis is carried out under relatively strong alkaline conditions, the pH being as high as 9–10.

The general process of lactonization to convert, e. g., 2-keto-l-gulonic acid, into ascorbic acid, is known in the art. Such lactonization has been carried out by heating the free acid in neutral, acid, or alkaline solution, or by heating esters of the keto-acid with sodium alkoxides, sodium acetate, calcium carbonate, or the like. A number of alkaline converting agents are shown in Ohle U. S. Patent 2,160,621. In this patent the reaction is carried out under neutral and aqueous conditions.

We have found that lower alkyl esters of acids of the following general formula:

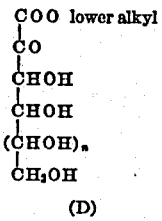

(D)

as well as amides of the following formula:

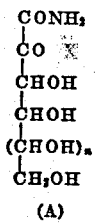

(A)

or ammonium salts of these amides, can be converted to saccharosonic acid salts. The ammonium salt (B), which is formed, can be treated with an acid, such as a mineral acid, whereby the free saccharosonic acid is liberated. Phosphoric acid is particularly useful. If an ester (D) is employed instead of an amide, the reaction involves an intermediate formation of amides (A) and (C), which amides need not be isolated. However, if desired, amides (A) and (C) can be separated and treated to carry out the conversion of this invention.

An illustrative example involves the treatment 2-keto-l-gulonic acid ester. This starting ester can be employed either as an isolated material or as an intermediate in the form of the reaction mixture as it is prepared in known manner. The conversion, using methyl ester of 2-keto-1-gulonic acid is shown as follows:

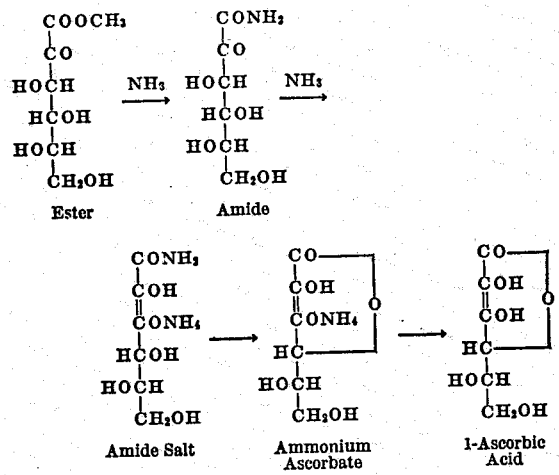

The significance of the invention will be made apparent by the following illustrative examples which will serve as a guide to those skilled in the art, to carry out the novel synthesis of our invention. It will be apparent that the esters may be treated in isolated condition or in the non-isolated form. The latter modification is of particular value from a commercial viewpoint. It will be appreciated that the proportion of reactants, times of reaction, temperatures of reaction, and the like, may be varied; and that supplementary processes, such as purification and the like, may be resorted to wherever found desirable or convenient. These and other variations and modification will be evident to those skilled in the art, in the light of the guiding principles disclosed herein.

EXAMPLE 1

*Preparation of ammonium ascorbate from an ester*

2-keto-1-gulonic acid methyl ester, 208 grams, was placed in a three-liter round-bottom flask fitted with a mercury sealed stirrer and a reflux condenser. Methyl alcohol, 1248 grams, was added to the flask and the contents were stirred with heating on a hot water bath until refluxing started. A vigorous stream of anhydrous ammonia (approximately 25 liters/hour) was passed into the stirred solution, with the inlet tube extending down to the bottom of the reaction flask.

The solution remained clear for 35 minutes, then a heavy deposit of ammonium ascorbate precipitated. The reaction was continued until a total time of two hours had elapsed from the start of the addition of the ammonia. The mixture was cooled at 10° C. for 30 minutes, and filtered. The solid ammonium ascorbate was dried in a vacuum dessicator.

EXAMPLE 2

*Preparation of ammonium ascorbate from an ester*

2-keto-1-gulonic acid methyl ester, 104 grams, was place in a two liter round-bottom flask fitted with a mercury sealed stirrer and a reflux condenser. Methyl alcohol, 624 grams, was added to the flask and the solution was heated on a hot water bath with stirring until refluxing started. A slow stream of anhydrous ammonia was passed into the solution (approximately 5 liters per hour) with the inlet tube extending to the bottom of the reaction flask. In 30 minutes, analysis of an acidified sample showed only 5.6 per cent of the theoretical of ascorbic acid was formed. After the reaction had proceeded for 120 minutes, the solution was still a clear yellow, but analysis of an acidified sample showed that the iodine value for ascorbic acid was up to 61 per cent of the theoretical. When a total time of 125 minutes had elapsed a heavy deposit of a light yellow colored ammonium ascorbate was deposited. The rate of the ammonia was then speeded up to approximately 20 liters per hour and the reaction was continued for an additional 35 minutes. The flask was then stoppered and allowed to set in a refrigerator overnight. Solid ammonium ascorbate was filtered off and dried in a vacuum dessicator.

EXAMPLE 3

*Sodium isoascorbate from an ester*

The methyl ester of 2-keto-d-gluconic acid, 52 grams, was placed in 312 grams of anhydrous methyl alcohol in a one liter round-bottom flask provided with a stirrer, condenser and a gas inlet tube extending to the bottom of the liquid. The flask was heated on a water bath until the alcohol began to reflux; then a vigorous stream of anhydrous ammonia, at atmospheric pressure, was passed into the stirred reaction mixture. In 15 minutes, all the ester was dissolved to give a yellow solution. The reaction was continued until there was no further increase in iodine consumption of a diluted and acidified sample which was pipetted out of the reaction flask. This took about 45 minutes additional. The pH of the solution at this time was 9.7. The methanol was distilled off under vacuum in order to remove the excess ammonia. The residue was redissolved in 400 cc. of methyl alcohol. Sodium hydroxide, 8 grams, was dissolved in 30 cc. of water and stirred into the alcoholic solution. On cooling overnight in the refrigerator, 39 grams of a tan colored sodium isoascorbate was obtained.

EXAMPLE 4

*The conversion of 2-keto-l-gulonic amide to ammonium ascorbate*

The amide of 2-keto-1-gulonic acid, 52 grams, which was prepared from the methyl ester of 2-keto-1-gulonic acid, was dissolved in 312 grams of methyl alcohol, to give a clear light straw colored solution. This was placed in a one liter round-bottom flask fitted with a mercury sealed stirrer and a reflux condenser and heated to reflux temperature by means of a hot water bath. A vigorous stream of anhydrous ammonia was passed into this with stirring (20 liters/hour). In 10 minutes, a heavy deposit of white ammonium ascorbate was deposited. The reaction was continued for an additional 15 minutes, then cooled to 10° C. and filtered. The residue of ammonium ascorbate was dried.

Typical starting amides can be prepared, for example as follows:

EXAMPLE A

*The preparation of 2-keto-l-gulonic amide*

62.5 grams of the butyl ester of 2-keto-1-gulonic acid was dissolved in 375 grams of anhydrous butyl alcohol. The solution was placed in a round-bottom flask provided with an efficient stirrer, and cooled to 10° C. by means of an ice-water bath. Anhydrous ammonia, at atmospheric pressure and at the approximate rate of 7 liters per hour, was passed through the solution for 90 minutes. The light yellow colored product which precipitated from the solution was filtered off by suction, washed in anhydrous ethyl ether and dried in a vacuum dessicator. The product was very soluble in methyl alcohol or water. It was hygroscopic and melted at 86–88° C. The product was the amide of 2-keto-l-gulonic acid.

Example B

*The preparation of 2-keto-l-gulonic amide*

52 grams of methyl ester of 2-keto-l-gulonic acid was dissolved in 1040 grams anhydrous ethyl alcohol with stirring on a steam bath. The solution was placed in a 2-liter flask provided with an efficient stirrer and surrounded with a water-bath kept at 35° C. This temperature was necessary to keep the methyl ester from crystallizing out of the solution and contaminating the amide. A stream of anhydrous ammonia was passed into the stirred solution for 90 minutes at a rate of 7 liters per hour. The reaction mixture was then surrounded with an ice-water bath and stirred for an additional 30 minutes to force the precipitation of the amide. The solid was filtered by suction, washed in anhydrous ethyl ether, and dried in a vacuum desiccator. On cooling the filtrate in a refrigerator overnight, an additional yield of the amide was obtained. The product was the amide of 2-keto-l-gulonic acid.

The ammonium salt of the saccharosonic acid, e. g., ammonium ascorbate, can be converted into free acid by the use of phosphoric acid. Thus, for each 6.5 grams of theoretically expected ascorbic acid, 100 cc. of a lower aliphatic alcohol (such as methanol) is employed, in which ammonium ascorbate is suspended. This suspension is treated with 5 per cent excess of phophoric acid (85 per cent sp. gr. 1.71) at room temperature (21° C.). The ammonium phosphate precipitates out, whereas the ascorbic acid remains in solution. The excess phosphoric acid is removed by stirring a theoretical amount of calcium carbonate into the mixture before filtering off the ammonium phosphate. The filtered solution is then distilled to dryness under vacuo whereby ascorbic acid is obtained as a white crystalline material. The ascorbic acid can be recrystallized, if desired, to obtain a purer form.

An example of converting ammonium ascorbate is given as follows:

Example C

*Preparation of ascorbic acid*

Ammonium ascorbate, 95.6 grams, with a purity of 97.8 per cent representing 85 grams (0.5 M) of ascorbic acid was suspended in 1308 grams of methyl alcohol. To this there was added with stirring 35.5 cc. of phosphoric acid (85 per cent, sp. gr. 1.71). The temperature of the solution was 21° C. The mixture was stirred for 10 minutes, then 5.0 grams of calcium carbonate and 2.0 grams of decolorizing carbon were added in the order named, and stirring was continued for an additional 5 minutes.

The solution was filtered by suction and placed in a two liter distillation flask. The inorganic residue on the filter was rinsed with 100 cc. of methyl alcohol which was warmed to 40° C., and this was then added to the first filtrate. The filtrate was distilled to dryness under a vacuum of 20 mm. of mercury. A white crystalline solid was obtained, which was ascorbic acid.

We claim:

1. A process which comprises treating a non-aqueous compound selected from the group consisting of those having the following general formulae:

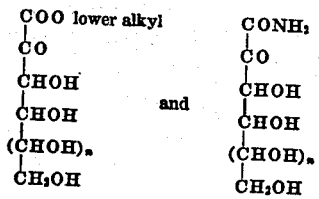

with ammonia under anhydrous and alkaline conditions to produce a compound selected from the group consisting of those having the following general formula, and salts thereof:

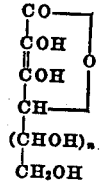

wherein $n$ is a member selected from the group consisting of zero and low positive integers.

2. A process according to claim 1 which comprises treating an amide of the general formula:

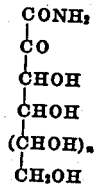

with ammonia under anhydrous and alkaline conditions, $n$ being a member of the group consisting of zero and low positive integers.

3. A process according to claim 1 carried out in the presence of a lower aliphatic alcohol, and in which there is formed an ammonium salt of the amide, as an intermediate.

4. A process according to claim 1 which comprises treating an amide of the general formula:

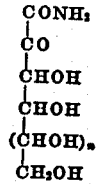

with ammonia under anhydrous and alkaline conditions and in the presence of a lower aliphatic alcohol, $n$ being a member of the group consisting of zero and low positive integers.

5. A process according to claim 1 in which a salt of the general formula:

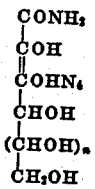

is γ-lactonized to produce the corresponding saccharosonic acid ammonium salt.

6. A process according to claim 1 in which $n$ represents one.

7. A process according to claim 1 employing the methyl ester of 2-keto-l-gulonic acid.

8. A process according to claim 1 employing the methyl ester of 2-keto-l-gulonic acid, and in which the process is carried out in the presence of a lower aliphatic alcohol.

9. A process which comprises γ-lactonizing a salt of an amide of the general formula:

to a member of the group consisting of saccharosonic acids and salts thereof, $n$ being a member selected from the group consisting of zero and low positive integers.

JOSEPH D. SURMATIS
ALFRED OFNER.

REFERENCES CITED

The following references are of record in the file of this patent:

UNITED STATES PATENTS

| Number | Name | Date |
|---|---|---|
| 2,160,621 | Ohle | May 30, 1939 |
| 2,179,978 | Elger | Nov. 14, 1939 |